United States Patent [19]

Selestam et al.

[11] 4,351,625
[45] Sep. 28, 1982

[54] APPARATUS FOR AUTOMATIC BOLTING IN ROCK REINFORCEMENT

[75] Inventors: Berndt Selestam, DalarUMLo/; Åke Forssell, Västerhaninge; Per Å. Winnersjö, Handen, all of Sweden

[73] Assignee: Linden-Alimak AB, Skelleftea, Sweden

[21] Appl. No.: 189,925

[22] PCT Filed: Jun. 13, 1979

[86] PCT No.: PCT/SE79/00134
§ 371 Date: Feb. 13, 1980
§ 102(e) Date: Feb. 6, 1980

[87] PCT Pub. No.: WO80/00093
PCT Pub. Date: Jan. 24, 1980

[30] Foreign Application Priority Data

Jun. 13, 1978 [SE] Sweden ............................ 7806833

[51] Int. Cl.³ ............................................ E21D 11/00
[52] U.S. Cl. .................................. 405/303; 405/260; 405/288; 173/22
[58] Field of Search ............... 405/303, 288, 259-261, 405/232; 175/52, 315; 173/22, 23, 38-42, 31, 35; 414/22, 10, 745, 743

[56] References Cited

U.S. PATENT DOCUMENTS 2,738,081  3/1956  Lee ..................................... 173/22 X
3,218,893  11/1965  Madison et al. .................. 173/43 X
4,226,559  10/1980  Prebensen .......................... 405/303
4,229,124  10/1980  Frey et al. .......................... 405/303

FOREIGN PATENT DOCUMENTS 2222646  6/1973  Fed. Rep. of Germany .
2657650  7/1977  Fed. Rep. of Germany .
2815070  10/1978  Fed. Rep. of Germany .
665096  5/1979  U.S.S.R. ............................... 405/303

*Primary Examiner*—Dennis L. Taylor
*Attorney, Agent, or Firm*—Cushman, Darby & Cushman

[57] ABSTRACT

An apparatus for automatic bolting in rock reinforcement, the apparatus (11) having a drill (3) an injector, a bolting machine (5), a supply beam (6) a machine carriage (7) which is movable along the supply beam, a linear machine shifter switch (8) by means of which the drill and the bolting machine may be inserted on the machine carriage and which is shiftably disposed along and lockable on the supply beam for different bolt lengths, a working position adjustment device (9) which has sockets (10,11,12) for accommodating a drill bit (13), the forward end of the hose (14) of an injector, a bolt, and a positioning rod (15) which is fixedly mounted on the forward end of the supply beam and may be brought into abutment with the rock face for directing, by means of the appartus, in sequence, the drill bit, the hose and the bolt, at a point on the rock face for the purpose of accomplishing the rock reinforcement operation.

3 Claims, 3 Drawing Figures

APPARATUS FOR AUTOMATIC BOLTING IN ROCK REINFORCEMENT

The present invention relates to an apparatus for automatic bolting in rock reinforcement operations, the apparatus comprising a drill, an injector and a bolting machine.

Prior art apparatuses of the above-mentioned type work with separate supply assemblies for each working phase, that is to say, drilling, injecting and bolting and tightening. Moreover, different bolt lengths may not optionally be utilised without replacement of the supply assemblies. The three separate supply assemblies are mounted on a common shaft which, during the working phase, is brought into abutment against the rock face. This prior art apparatus possesses certain disadvantages. The supply assemblies are of great weight which entails that movability of the apparatus is restricted such that but a few bolt insertion operations can be effected at one and the same machine positioning. Accuracy in the change of working phase is very poor and the equipment requires heavy vehicles and, thereby, also large diesel engines, which entails a dangerous increase in the exhaust gas discharge from the rock chamber. Furthermore, the distance between the apparatus and its point of operation on the rock face is short, which, from the point of view of safety, is disadvantageous.

The object of the present invention is to realise, while avoiding the above-mentioned disadvantages, an apparatus for automatic bolting in rock reinforcement operations, the apparatus being simple and reliable in its construction and function.

A further object of the present invention is to realise an apparatus which may be incorporated in existing drilling and bolting assemblies for rock chambers.

The objects are achieved according to the invention in that the apparatus comprises a supply beam, a machine carriage which is movable along the supply beam, a linear machine shifter switch by means of which the drill and the bolting machine are movable on the machine carriage and which is shiftably disposed along and lockable on the supply beam for different bolt lengths, a working position adjustment device which has sockets for accommodating a drill bit and the forward end of the hose of an injector, a bolt and a positioning rod fixedly disposed at the forward end of the supply beam, the rod being brought into abutment against the rock face in order to direct, by means of the apparatus, in sequence, the bit, the hose and the bolt at a point on the rock face for the purposes of accomplishing the contemplated rock reinforcement operation.

Thus, the present invention provides an apparatus of low weight which, consequently, has a broad range of movement and may carry out a great number of bolting operations at one and the same machine positioning. Furthermore, the apparatus displays great accuracy in change of working phase. Finally, the distance between the machine and the point of operation is considerably greater than in prior art apparatuses.

Because the equipment according to the invention is light in weight, it is possible to use light vehicles with small diesel engines. Furthermore, because the linear machine shifter switch is mounted on a machine carrier which may be moved along the supply beam, it is a simple operation to preset any optional bolt length for the rock face in question.

The nature of the present invention will be more readily understood from the following brief description of the accompanying drawings, which show one preferred embodiment, and discussion relating thereto.

Figure 1:
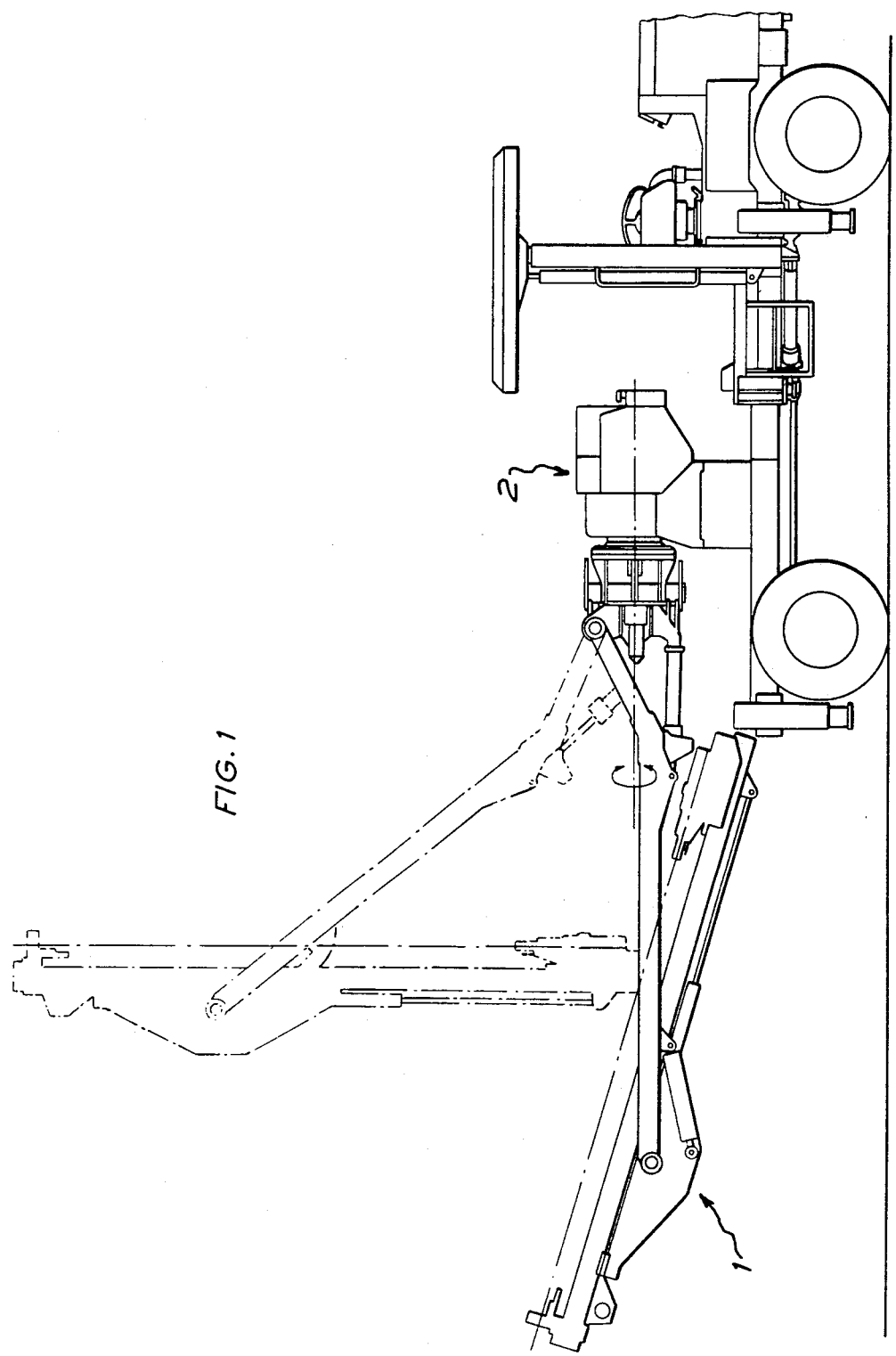
FIG. 1 shows a bolting assembly with an apparatus according to the invention, the solid lines of the drawing showing the apparatus in the lowered position and the broken lines showing the apparatus in a substantially vertical position.

FIG. 1 shows an apparatus 1 according to the invention for automatic bolting in rock reinforcement operations. The apparatus 1 is mounted on a vehicle 2 in which the operator sits protected during the entire rock reinforcement operations. The apparatus 1 comprises a drill 3, and injector (not shown) which has a hose insertion device 4, a bolting machine 5, a supply beam 6, a machine carriage 7 which is shiftably mounted along the supply beam, a linear machine shifter switch 8 by means of which the drill 3 and the bolting machine 5 are insertable on the machine carriage 7 and which is shiftably disposed along and lockable on the supply beam 6 for different bolt lengths, a working position adjustment device 9 which has sockets 10, 11, 12 for accommodating a bit 13, the forward end of a hose 14 of the injector 4, a bolt (not shown) and a positioning rod 15 which is fixedly mounted at the forward end of the supply beam and which may be brought into abutment against the rock face for directing, by means of the apparatus, in sequence, the bit 13, the hose 14 and the bolt at a point on the rock face for the purposes of accomplishing the contemplated rock reinforcement operation.

The apparatus further comprises a first piston and cylinder assembly 16, by means of which the three working positions of the working position adjustment device 9 may be set, and a second piston and cylinder assembly 17 which is operative to move the drill 3 and the bolting machine 5 to and from their working positions.

The injector has a hose insertion device 4 which feeds the hose 14 into the hole drilled by the bit 13 for carrying out the injection operation in the hole when the injector is in its working positions.

Figure 2:
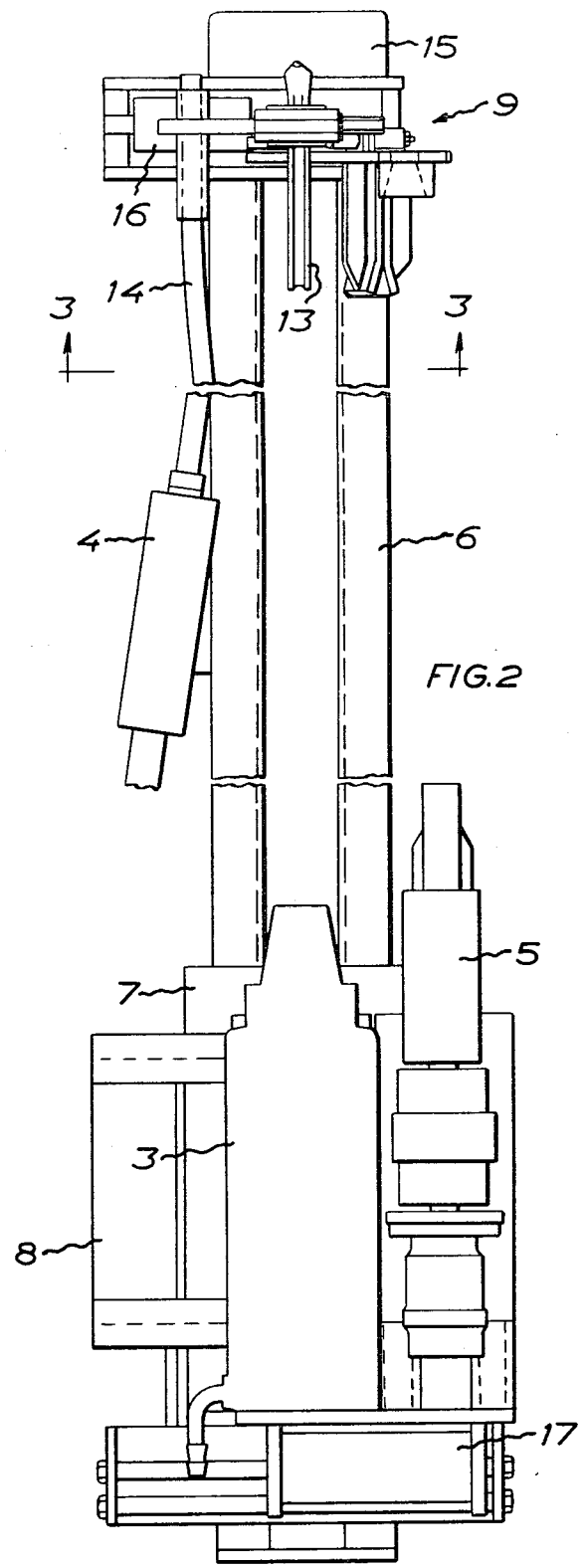
FIG. 2 is a plan view of the apparatus.
Figure 3:
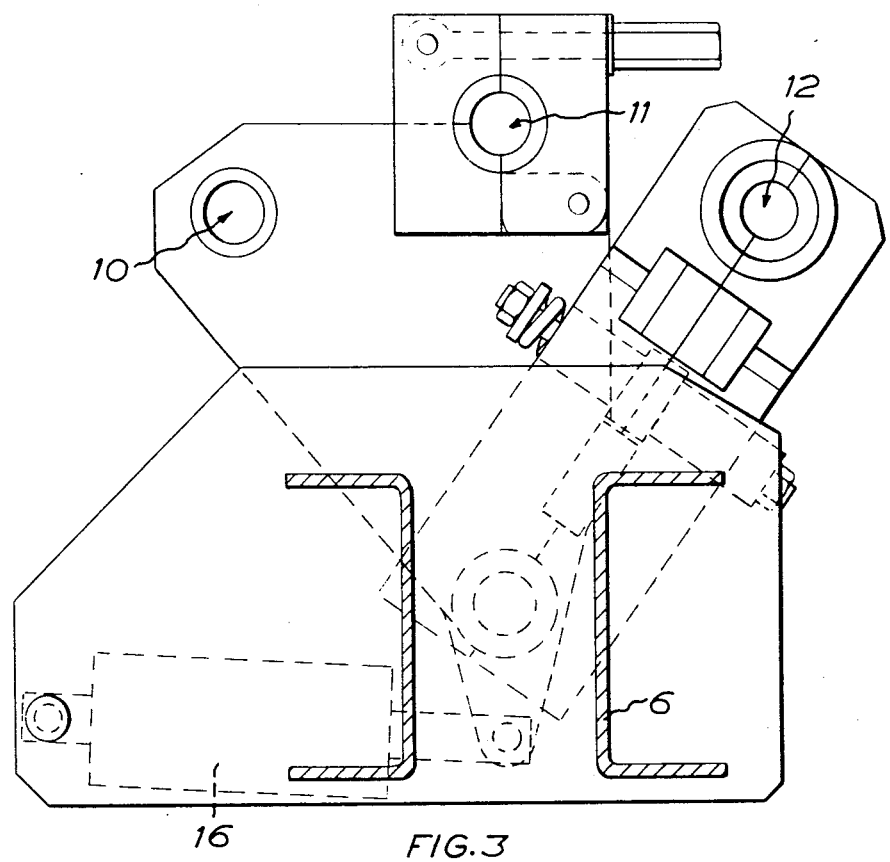
FIG. 3 is a cross-section taken along the line 3—3 in FIG. 2.

As is apparent from FIG. 2, the machine shifter switch 8 has three positions, of which the central position is the same as the working position of the apparatus, and of which the two outer positions are positions of rest for the drill 3 and the bolting machine 5.

The apparatus according to the invention functions in the following manner:

The operator moves the positioning rod of the supply device into abutment with the rock face where the rock is to be reinforced. The drill 3 and socket 11 of the drill are in the central position with an adapted drilling bit in place. Drilling is then carried out to the predetermined drilling depth. Thereafter, the drill automatically returns to the machine shifter switch 8. The second piston and cylinder assembly 17 then moves the drill 3 to the left with respect to FIG. 2 to its rest position on the machine shifter switch 8. The first piston and cylinder assembly 16 moves the injector hose socket 10 to the central position or working position. The hose insertion device 4 inserts the hose into the drill hole, whereafter the operator carries out the injection operation in the drill hole from his place on the vehicle. When the injection operation is completed, the hose insertion device 4 withdraws the hose to the initial position. The second piston and cylinder assembly 17 moves over the bolting machine 5 to the central position at the same time as the drill 3 is moved over to its rest position. During the same phase, the first piston and cylinder assembly 16 for the working position adjustment device 9 moves the bolt socket over to the central position. The bolting machine 5 with an adapted anchorage bolt now executes its bolt insertion operation. The socket 12 of the bolt is designed such that it automatically opens when the adapter of the bolting machine is to pass. Thereafter, the bolting machine returns to the initial position. The second piston and cylinder assembly 17 switches the drill 3 over to the central position at the same time as the bolting machine 5 is moved to the rest positions. At the same moment, the first piston and cylinder assembly 16 moves the socket 12 of the drill over to the central position.

Naturally, the shifting of the working position adjustment device 9 and the machines 3 and 5 need not take place simultaneously, since a certain amount of play is permitted between, on the one hand the drill, and, on the other hand, its socket 11 and the drill 3, and between, on the one hand, the bolt, and, on the other hand, its socket 13 and the bolting machine 5.

If rock bolting operations are being carried out with different bolt lengths, the apparatus according to the invention is adjusted in the following manner:

The machine shifter switch 8 is set at a central position, whereafter the locking on the supply beam 6 is released and the machine shifter switch is moved to a new position and locked. Thereafter, the machine shifter switch 8 is positioned with the drill 3 in the central position. The rock reinforcement operation can thereafter be repeated.

We claim:

1. An apparatus for automatic bolting in rock reinforcement operations, the apparatus comprising a supply beam (6), which carries a drill (3), an injector, a bolting machine (5), a working position adjustment device (9) which has sockets (10, 11, 12) for accommodating a drill bit (13), the forward end of the hose (14) of the injector, a bolt, and a positioning rod (15) which is fixedly mounted at the forward end of the supply beam and is brought into abutment with the rock face for directing, by means of the apparatus, in sequence, the drill bit, the hose and the bolt at a point on the rock face for the purposes of accomplishing the rock reinforcement operation, characterized in that a machine carriage (7), which during operation is adapted to accommodate the drill (3) or the bolting machine (5), is movable along the supply beam (6), and that a linear machine shifter switch (8), by means of which the drill (3) and the bolting machine (5) are insertable on the machine carriage (7), is shiftably disposed along and lockable on the supply beam (6) for different bolt lengths.

2. The apparatus as recited in claim 1, characterized in that it comprises a first piston and cylinder assembly (16) by means of which the three working positions of the working position adjustment device are set, and a second piston and cylinder assembly (17) which is operative to move the drill (3) and the bolting machine (5) to and from their working positions.

3. The apparatus as recited in claim 1 or 2, characterized in that the injector has a hose insertion device (4) which feeds the hose (14) into the hole drilled by the drill bit (13) for the purposes of carrying out injection into the hole.

* * * * *